Figure 2:
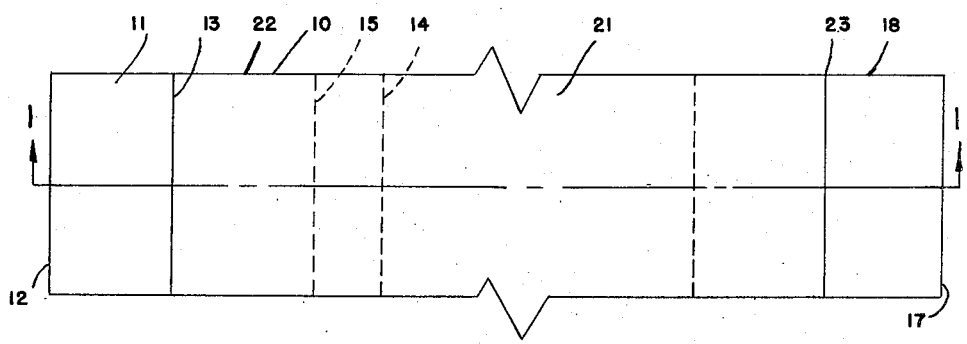

Sept. 13, 1960     I. B. BENSEN     2,952,320

AIRFOIL

Filed April 30, 1956

*INVENTOR.*
IGOR B. BENSEN
BY
ATTORNEY

United States Patent Office 2,952,320
Patented Sept. 13, 1960

2,952,320

AIRFOIL

Igor B. Bensen, Raleigh, N.C., assignor to Bensen Aircraft Corporation, Raleigh, N.C., a corporation of North Carolina Filed Apr. 30, 1956, Ser. No. 581,653

7 Claims. (Cl. 170—159)

The present invention relates to airfoils and particularly to an airfoil profile in which a considerable portion of the profile is constituted by linear reaches of considerable extent without appreciably diminishing the aerodynamic characteristics or efficiency of the airfoil section.

In the design and selection of wing sections, propellers and rotor blades, it is conventional practice to determine the optimum airfoil section to be employed for the desired flight characteristics by reference to the classification system of airfoil sections in the N.A.C.A., the Clark Y, and the Munk series. In each airfoil of these series, the airfoil profile is formed by having a prescribed curvilinear contour along the upper camber from the leading to the trailing edges. Most airfoils are nonsymmetrical and some have a lower camber formed with a linear reach along a portion of the lower surface.

The blades of conventional helicopter rotors are about fifteen to twenty times as long as they are wide with the airfoil thickness ratios varying between 9 percent and 20 percent. Airfoils are used in rotor blade design which have low pitching moment coefficients.

The early types of rotor blades that were fabricated consisted of a steel spar structural member with individual contour ribs, usually cut from plywood, and the ribs were fastened individually to the spar by metal collars. The leading portion of the rotor blade was built up of solid wood with curved plywood reaching back to the spar line. The entire blade was finally covered with a fabric which was sewn or fastened to each rib. To overcome objectionable surface irregularities and fabric distortions of the fabric covered rotor blades the same basic internal structure was used in later modifications but the entire blade then was covered with thin plywood. These curvilinear blade contours required highly skilled craftsmen to construct them resulting in low production and high unit cost. All-wood blades built up from laminations of several woods have been used more recently, but while the straight sections are relatively simple to laminate, the contoured sections are difficult and costly to fabricate. Metal blades built from pieces of contoured sheet stock or extrusions have been produced but the cost is also extremely high.

Smooth, nondeformable blade surfaces are vital for rotor blade construction in order to reduce power consumption. In the use of fabric-covered blades, the rough, deformable surfaces may require as much as 10 percent more power to support a given load than do blades having smooth and accurate leading edge contours and rigid surfaces.

Although most rotor blades at the present time are composed of conventional wing sections, there are a number of special airfoil sections which have been designed specifically for application as rotor blades. The desirable aerodynamic characteristics of airfoil sections suitable for use as rotor-blade sections are:

(1) Nearly zero pitching moment;
(2) Low drag throughout the range of low and moderate lifts; and
(3) Moderate drag at high lifts.

Therefore, it is an object of the present invention to provide an airfoil of composite construction in which suitable aerodynamic characteristics may be achieved by having the upper surface of the airfoil fabricated with a rectilinear reach of appreciable extent.

Yet another object of the present invention is the provision of an airfoil having the upper surface covering on the downstream portion of the airfoil beyond the maximum camber formed substantially of a single straight rectilinear reach.

Still another object of the present invention is to provide an airfoil of sturdy composite fabricated construction in which the upper surface covering beyond the highest point or maximum camber of the airfoil profile is a straight inclined plane surface.

Another feature of the present invention is the provision of an airfoil construction in which straight plywood sections are assembled to form the desired airfoil contour.

The present invention contemplates the inexpensive fabrication of an airfoil for application as a rotor blade or the like in which the leading rounded edge of the airfoil profile may be formed of a single solid wood section or one which may be laminated and the other sections of the airfoil may be fabricated of laminated sections of plywood or other suitable materials, with the upper surface of the airfoil beyond approximately the quarter-chord length having a straight length which reaches downstream for a considerable distance and with the lower surface of the airfoil forming a straight rectilinear length which straight length may commence from a position upstream of the quarter-chord length.

Figure 1:
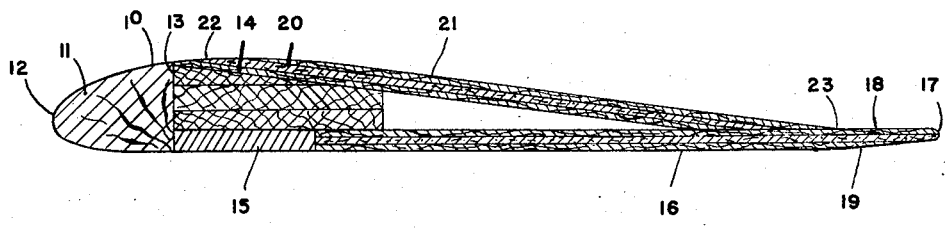

Other objects and advantages of the present invention will be readily apparent to those skilled in this art during the course of the following general and detailed description of one preferred embodiment of the present invention had in conjunction with the accompanying drawing which forms a part of this specification and in which:

Fig. 1 is a transverse sectional view taken substantially along the plane of line 1—1 of Fig. 2 and illustrates a preferred embodiment of the airfoil profile of the present invention; and Fig. 2 is a partial plan view of the airfoil of Fig. 1.

Referring to the drawing there is shown in Fig. 1 an airfoil profile 10 which embodies the present invention of a fabricated airfoil that may be used as a rotor blade for a helicopter or gyroplane. Although the airfoil of this invention will be described for application as a rotor blade in this specification, it is not intended in any limitative sense. The airfoil profile is fabricated into a unitary structure by utilizing various structural components which are fastened together to form the desired contour. The leading section of the airfoil is provided with a nose-weight member 11 which is preferably formed from a solid wood member. The leading edge 12 of the nose member 11 is rounded to attain the optimum aerodynamic properties during flight conditions. The upper and lower surfaces of the nose-weight member reach rearward in curvilinear contour terminating at the side 13. In the illustrated form the nose member has a double camber with the curvature corresponding substantially to conventional airfoil practice.

Abutting the nose-weight member 11 is a reinforcing spar 14 which may be of plywood or solid wood. The forward side of the spar is fastened as by a suitable bonding adhesive or other suitable means to the side 13 with the bottom of the spar displaced vertically to receive the lower surface linear spar 15. Spar 15 is fastened by means of screws or other suitable means (not shown) to the spar 14 so that the leading edge is flush mounted against the side 13 with the lower curvature of the nose-weight member merging with the straight surface of the spar 15. Spar 15, preferably made of steel, reaches rearwardly from the side 13 of member 11 beyond the quarter-chord length.

The remaining lower surface of the downstream reach of the airfoil is formed by the lower plane surface member or lower skin 16 which is fastened to the spar 15 at one side. The lower skin 16 extends through to the trailing edge 17 with the trailing section 18 of the member 16 forming the reflex angle 19. In those construction where plywood is utilized to form the blade covering, the neutral axis of the lower skin plywood may reach to the trailing edge. The reflex angle 19 in the trailing section may be formed by removing sufficient material from the lower surface of the reflex section. In the illustrated airfoil, a three-ply laminated plywood member may be sanded or planed to form the reflex contour.

The upper surface 20 of the reinforcing spar 14 is planed or sanded to form an inclined plane surface which reaches fore and aft of the maximum camber position. It will be apparent that the spar 14 reaches for the span of the rotor blade or wing section.

To the upper surface 20 of the spar 14 is added a top plane surface skin 21 forming the upper surface of the airfoil. The surface skin 21 extends rectilinearly in cross-sectional view from a position upstream of the highest point in the airfoil profile to a remote position downstream. The forward portion 22 of the surface member 21 is curved as by sanding or other mechanical working to form a curved portion which will merge with the rounded surface of the nose at the region of the side 13.

Extending from the highest point on the upper surface of the airfoil to the terminal position 23 at the trailing section 18 is a straight rectilinear reach. Plywood having three plies has been found satisfactory for fabricating this linear reach which will extend longitudinally for the span of the airfoil. Normally this upper surface member 21 may be mounted and adhered in sheet form on the spar 14 and subsequently sanded or planed in situ to give the requisite curvature at the forward portion 22.

One illustrative example of an airfoil profile incorporating the principle of this invention found to be successful during flight conditions and not intended to limit the invention is as follows:

| Station | Upper Surface | Lower Surface |
| --- | --- | --- |
| 0 | 3.50 | 3.50 |
| 1.25 | 5.50 | 1.97 |
| 2.5 | 6.50 | 1.35 |
| 5.0 | 7.90 | 0.65 |
| 7.5 | 8.85 | 0.22 |
| 10.0 | 9.60 | 0.0 |
| 20 | 11.36 | 0.0 |
| 30 | 11.70 | 0.0 |
| 40 | 10.82 | 0.0 |
| 50 | 8.85 | 0.0 |
| 60 | 6.94 | 0.0 |
| 70 | 5.05 | 0.0 |
| 80 | 3.10 | 0.0 |
| 90 | 2.00 | 0.56 |
| 95 | 2.00 | 1.12 |
| 100 | 2.00 | 1.68 |

*Remarks*

(1) Lower surface is a straight line from station 10 to 80 and from 90 to 100.

(2) Upper surface is a straight line from station 42 to 80 and from 90 to 100.

(3) Stations and ordinates are given in percent of airfoil chord.

(4) Pitch is measured with respect to the bottom surface.

(5) Chordwise mass balance about Station 25 produces zero moment characteristics from 3° to 8° pitch.

(6) Maximum C lift=1.3 at 12° pitch
C lift=0.3 at 0° pitch

For the purpose of this specification and without purporting to unduly restrict the interpretation of the terms "linear reach," "rectilinear reach" and "straight line reach," as these terms are employed, they shall refer particularly to the covering on the upper surface of the rotor blade airfoil, the profile line and also the surface of the covering on the upper surface of the covering member extending from substantially the highest point on the upper surface of the airfoil to a remote location downstream. In the use of plywood for the surface covering, the normal plane surface will not be molded or bent, however, the surface may be scraped or sanded to follow the desired contour of the rotor profile. Where a plurality of laminated plies form the plywood covering, the individual plies are in plane parallel relationship to each other.

Obviously many modifications and variations of the present inventive concept are possible in the light of the above teachings. It is therefore to be understood that within the scope of the appended claims the invention may be practiced otherwise than as specifically described and modification are contemplated.

What is claimed is:

1. An aircraft sustaining rotor blade airfoil profile in section comprising a solid wood nose portion having a leading rounded edge and curvilinear upper and lower surfaces extending from the leading edge rearwardly terminating in a vertical side, a laminated central spar member reaching fore and aft of the maximum camber location which is from one-third to one-fourth of the chord length aft of the leading edge, said central spar member having a height less than said vertical side of the nose portion and fastened thereto intermediate the side height, a metal spar member mounted along the lower surface of the airfoil abutting the vertical edge and contiguous to the central spar member, a plywood lower surface extending rectilinearly from abutment with one end of the metal spar member to a trailing edge, said plywood surface being contiguous for at least a portion of its length to the central spar member, and a plywood upper surface reaching in a plane from the upper vertical edge of the nose portion to a trailing edge, said upper surface being contiguous to the central spar member for at least a portion of the reach, the upper and lower surfaces converging to form a trailing edge of the blade.

2. An aircraft sustaining rotor blade having an airfoil profile in section comprising a rounded nose portion having curvilinear upper and lower surfaces and a vertical rear side, a central reinforcing spar member abutting and mounted to the rear side of the nose portion and intermediate the height thereof, plywood surface coverings reaching rectilinearly along the upper and lower surfaces of the blade and being contiguous for a portion of their respective reaches and affixed to the central spar member, said coverings converging to form a trailing edge.

3. An aircraft sustaining rotor blade having an airfoil profile in section comprising a rounded solid wood nose portion having curvilinear upper and lower surfaces and a vertical terminal side, a central spar member abutting the nose portion vertical side, said spar member being mounted to said vertical side, a metal spar member abutting the terminal side along the lower surface of the airfoil contiguous to the central spar member and fastened thereto, an upper and lower plane plywood covering reaching rectilinearly rearwardly converging together to form the trailing edge of the blade.

4. An aircraft sustaining rotor blade having an airfoil profile in section comprising a leading rounded nose portion having a curvilinear upper surface and a terminal vertical rear side, a central reinforcing spar member mounted on the terminal rear side of the nose portion, a metal spar member mounted contiguous to the lower surface of the central spar member in abutment with the rear side of the nose portion, an upper plywood covering reaching rectilinear rearwardly in sheet form to a trailing edge, said upper covering being contiguous to and mounted on the central spar member for at least a portion thereof, and a lower plane plywood covering reaching rectilinear rearwardly to a trailing edge from abutment with the metal spar and in contiguity with the central spar member, said upper and lower coverings converging to form a trailing edge of the blade.

5. An aircraft rotor blade having an airfoil profile in section comprising a leading rounded wood nose portion having a curvilinear upper surface and a terminal vertical rear side, a central reinforcing spar member mounted on the terminal rear side of the nose portion, a metal spar mounted contiguous to the lower surface of the central spar member in abutment with the rear side of the nose portion, an upper plywood covering reaching rearwardly in plane sheet form and having a rectilinear reach for an extent of not less than 30 percent of the chord length from substantially the maximum camber downstream, and a lower plywood covering in sheet form reaching rectilinearly rearwardly to a trailing edge from abutment with the metal spar and in contiguity with the central spar member, said upper and lower coverings converging to form a trailing edge.

6. An aircraft sustaining rotor blade having an airfoil profile in section comprising a rounded wood nose portion having a leading edge and a curvilinear upper surface, said upper surface reaching approximately to the airfoil maximum camber, and upper and lower surfaces extending in plane sheet form mounted to the nose portion and extending rectilinearly from the maximum camber rearwardly to converge to form a trailing edge of the plate.

7. An aircraft rotor blade having an airfoil profile in section comprising a rounded wood nose portion having a curvilinear upper surface, said upper surface reaching from a position located substantially between one-third to one-fourth of the chord length, a reinforcing spar member contiguous to said nose portion and fastened thereto, and an upper and a lower plywood covering extending in plane sheet form rearwardly from the nose portion downstream, said upper and lower coverings converging rearwardly to form a trailing edge of the blade.

References Cited in the file of this patent

UNITED STATES PATENTS

| | | |
|---|---|---|
| 1,803,030 | Messerschmitt | Apr. 28, 1931 |
| 2,067,228 | Bennett | Jan. 12, 1937 |
| 2,070,657 | Hafner | Feb. 16, 1937 |
| 2,152,861 | Bennett | Apr. 4, 1939 |
| 2,283,956 | Smith | May 26, 1942 |
| 2,303,707 | Pullin | Dec. 1, 1942 |
| 2,396,811 | Bathras | Mar. 19, 1946 |
| 2,467,031 | Hess | Apr. 12, 1949 |

FOREIGN PATENTS

| | | |
|---|---|---|
| 194,632 | Switzerland | Mar. 1, 1958 |
| 352,507 | Great Britain | July 10, 1931 |